US008611120B2

(12) United States Patent
Okuda et al.

(10) Patent No.: US 8,611,120 B2
(45) Date of Patent: Dec. 17, 2013

(54) POWER CONVERSION APPARATUS (75) Inventors: Tatsuya Okuda, Tokyo (JP); Akihiko Iwata, Tokyo (JP); Kenji Fujiwara, Tokyo (JP); Kikuo Izumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 114 days.

(21) Appl. No.: 13/376,517

(22) PCT Filed: Nov. 26, 2009

(86) PCT No.: PCT/JP2009/006375
§ 371 (c)(1),
(2), (4) Date: Dec. 6, 2011

(87) PCT Pub. No.: WO2010/146637
PCT Pub. Date: Dec. 23, 2010

(65) Prior Publication Data
US 2012/0092915 A1   Apr. 19, 2012

(30) Foreign Application Priority Data
Jun. 19, 2009   (JP) ................................ 2009-145898

(51) Int. Cl.
*H02M 7/5387*   (2007.01)
(52) U.S. Cl.
USPC ........................................................ 363/132
(58) Field of Classification Search
USPC ................ 363/71, 98, 132, 40, 41, 55, 56.01, 363/56.02, 56.06, 95, 131
See application file for complete search history.

(56) References Cited

U.S. PATENT DOCUMENTS

| 4,443,841 A | 4/1984 | Mikami et al. |
| 5,459,655 A | 10/1995 | Mori et al. |

(Continued)

FOREIGN PATENT DOCUMENTS

| JP | 56 115182 | 9/1981 |
| JP | 56 121374 | 9/1981 |

(Continued)

OTHER PUBLICATIONS

International Search Report Issued Mar. 2, 2010 in PCT/JP09/006375 Filed Nov. 26, 2009.

*Primary Examiner* — Gary L Laxton
*Assistant Examiner* — Kyle J Moody
(74) *Attorney, Agent, or Firm* — Oblon, Spivak, McClelland, Maier & Neustadt, L.L.P.

(57) ABSTRACT

A power conversion apparatus including: a three-level inverter including bridge circuits each including a first semiconductor switching device and a second semiconductor switching device connected in series, the bridge circuits being connected to a positive terminal and a negative terminal of a DC power supply, and switch circuits having bidirectional characteristics and connected to respective AC output terminals of the bridge circuits which are the connection points between the first semiconductor switching devices and the second semiconductor switching devices, and to an intermediate potential point of the DC power supply; and single-phase inverters each including a plurality of semiconductor switching devices and respectively connected in series to the AC output terminals of the bridge circuits. The sum of an output voltage of the three-level inverter and output voltages of the single-phase inverters is supplied to a load.

11 Claims, 5 Drawing Sheets

(56) References Cited

U.S. PATENT DOCUMENTS

| | | | |
|---|---|---|---|
| 5,731,970 | A | 3/1998 | Mori et al. |
| 5,801,936 | A | 9/1998 | Mori et al. |
| 5,929,519 | A | 7/1999 | Mori et al. |
| 6,480,403 | B1 * | 11/2002 | Bijlenga .................. 363/98 |
| 7,596,008 | B2 | 9/2009 | Iwata et al. |
| 7,602,626 | B2 | 10/2009 | Iwata et al. |
| 7,719,865 | B2 | 5/2010 | Iwata et al. |
| 2009/0116268 | A1 * | 5/2009 | Kishida et al. .................. 363/68 |
| 2010/0177540 | A1 | 7/2010 | Iwata et al. |

FOREIGN PATENT DOCUMENTS

| | | | |
|---|---|---|---|
| JP | 5 83947 | | 4/1993 |
| JP | 7 79570 | | 3/1995 |
| JP | 2000 166251 | | 6/2000 |
| JP | 2000166251 | * | 6/2000 |
| JP | 2002 247862 | | 8/2002 |
| JP | 2006 174663 | | 6/2006 |
| JP | 2006 304530 | | 11/2006 |
| JP | 2006304530 | * | 11/2006 |

* cited by examiner

POWER CONVERSION APPARATUS

TECHNICAL FIELD

The present invention relates to a power conversion apparatus that converts a DC power to an AC power.

BACKGROUND ART

One example of conventional power conversion apparatuses is a power conversion apparatus including a three-level inverter and single-phase inverters connected to the three-level inverter, as disclosed in Patent Literature 1. The power conversion apparatus includes: a three-level inverter including switching sections for three phases each of which allows three levels of voltages to be outputted as an output voltage for one phase, the switching sections being connected to a common DC power supply; and single-phase inverters connected to the respective DC power supplies and corresponding to the respective phases of the three-level inverter. Each of the output terminals of the three-level inverter is connected to one of the AC output terminals of the corresponding single-phase inverter, and the other one of the AC output terminals of each of the single-phase inverters is connected to an AC motor.

CITATION LIST

Patent Literature

PATENT LITERATURE 1: Japanese Laid-Open Patent Publication No. 2000-166251

DISCLOSURE OF THE INVENTION

Problems to be Solved by the Invention

The above conventional power conversion apparatus uses a three-level inverter of a neutral point clamp type, which clamps the neutral points of switching sections of the three-level inverter by diodes. In this configuration, currents necessarily flow in two semiconductor devices per one phase of the three-level inverter. Therefore, it is difficult to reduce conduction loss, and power conversion efficiency is deteriorated.

The present invention has been made to solve the above problems, and an object of the present invention is to, in a power conversion apparatus including a three-level inverter and single-phase inverters in a combined manner, reduce conduction loss and improve power conversion efficiency.

Solution to the Problems

A power conversion apparatus according to the present invention comprises: a three-level inverter; and a single-phase inverter. The three-level inverter includes: a bridge circuit including a first semiconductor switching device and a second semiconductor switching device connected in series, the bridge circuit being connected to a positive terminal and a negative terminal of a DC power supply; and a switch circuit having a bidirectional characteristic and connected to an AC output terminal of the bridge circuit which is the connection point between the first semiconductor switching device and the second semiconductor switching device, and to an intermediate potential point of the DC power supply. The single-phase inverter includes a plurality of semiconductor switching devices and is connected in series to the AC output terminal of the bridge circuit. The power conversion apparatus supplies, to a load, the sum of an output voltage of the three-level inverter and an output voltage of the single-phase inverter.

Effect of the Invention

According to the power conversion apparatus of the present invention, it is possible to reduce, to one, the number of semiconductor switching devices in which currents flow per one phase of the three-level inverter when the three-level inverter outputs a positive or negative voltage, thereby reducing conduction loss. Therefore, it becomes possible to improve power conversion efficiency of the power conversion apparatus. In addition, it becomes possible to reduce the discharge amount of carbon dioxide, and to reduce the cost and the size of the power conversion apparatus by simplification of a cooling apparatus.

BEST MODE FOR CARRYING OUT THE INVENTION

Embodiment 1

Figure 1:
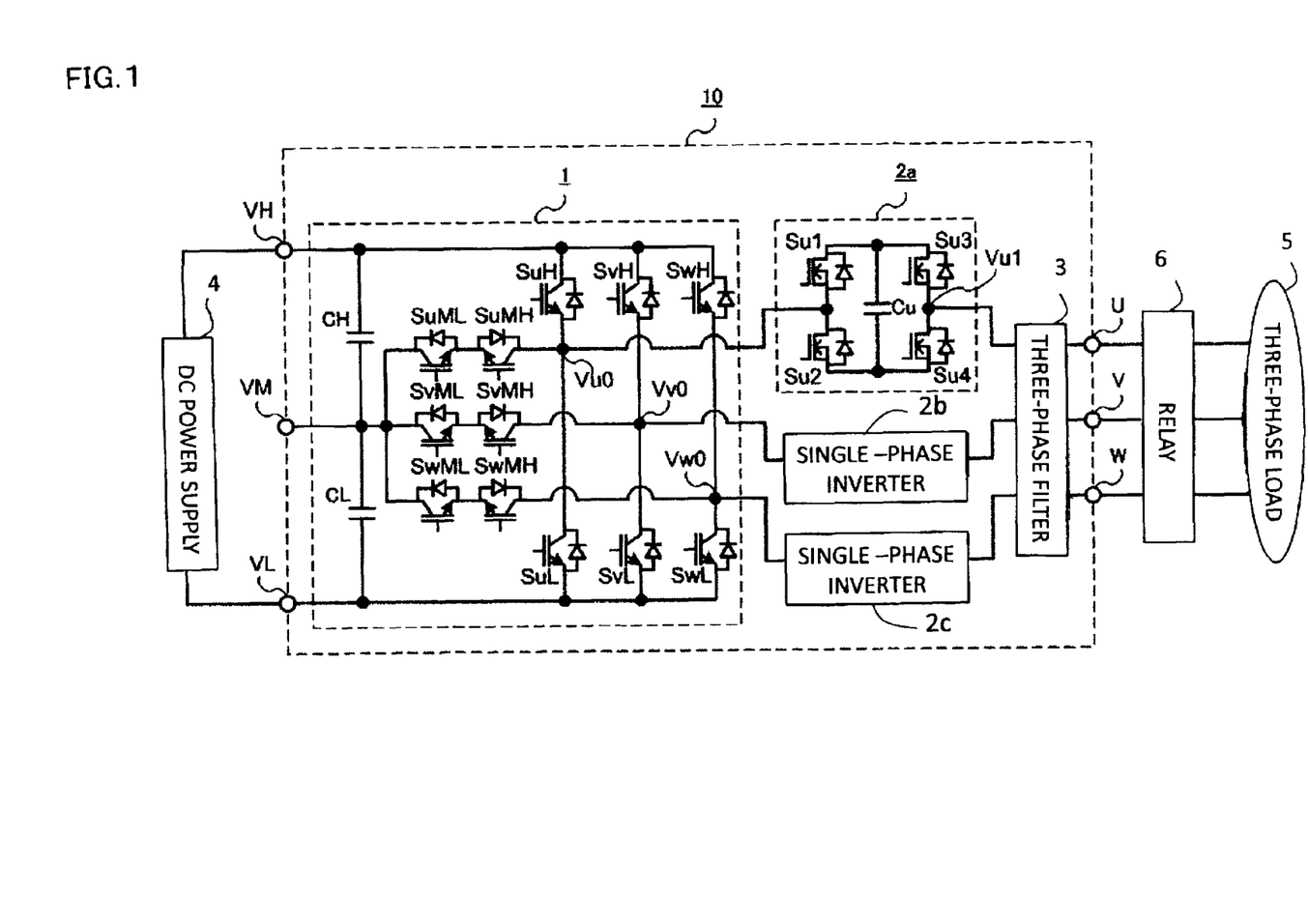
FIG. 1 is a diagram showing the circuit configuration of a power conversion apparatus according to embodiment 1 of the present invention.

FIG. 1 is a diagram showing the circuit configuration of a power conversion apparatus according to embodiment 1 of the present invention. As shown in FIG. 1, a power conversion apparatus 10 includes a three-level inverter 1, single-phase inverters 2a, 2b, and 2c, and a three-phase filter 3. The power conversion apparatus 10 converts a DC power outputted from a DC power supply 4, to an AC power, and supplies the AC power to a three-phase load 5. In addition, the power conversion apparatus 10 has not only a DC/AC conversion function of converting a DC voltage inputted between a positive terminal VH and a negative terminal VL, to three-phase AC voltages, and outputting the three-phase AC voltages to a U-terminal, a V-terminal, and a W-terminal, but also an AC/DC conversion function of converting three-phase AC voltages inputted to the U-terminal, the V-terminal, and the W-terminal, to a DC voltage, and outputting the DC voltage between the positive terminal VH and the negative terminal VL. Since basic operations of the two functions are the same, the description of the AC/DC conversion will be omitted.

First, the configuration of the three-level inverter 1 will be described. The positive terminal VH and the negative terminal VL of the three-level inverter 1 are connected to a positive terminal and a negative terminal of a DC power supply 4, respectively. The three-level inverter 1 includes smoothing capacitors CH and CL, a U-phase bridge circuit (SuH and SuL), a V-phase bridge circuit (SvH and SvL), a W-phase bridge circuit (SwH and SwL), a U-phase switch circuit (SuMH and SuML), a V-phase switch circuit (SvMH and SvML), and a W-phase switch circuit (SwMH and SwML).

The smoothing capacitors CH and CL (hereinafter, referred to as capacitors CH and CL) are connected in series. The high voltage terminal of the capacitor CH is connected to the positive terminal VH, and the low voltage terminal of the capacitor CL is connected to the negative terminal VL. In addition, an intermediate voltage terminal VM, which is the intermediate potential point of the DC power supply 4, is connected to the connection point between the capacitor CL and the capacitor CH.

The U-phase bridge circuit (SuH and SuL), the V-phase bridge circuit (SvH and SvL), and the W-phase bridge circuit (SwH and SwL) include respective first semiconductor switching devices (SuH, SvH and SwH) and respective second semiconductor switching devices (SuL, SvL, and SwL) that are connected in series, respectively. Each of the U-phase bridge circuit (SuH and SuL), the V-phase bridge circuit (SvH and SvL), and the W-phase bridge circuit (SwH and SwL) is connected to the positive terminal VH and the negative terminal VL. Each of the semiconductor switching devices SuH, SvH, SwH, SuL, SvL, and SwL may be, for example, an IGBT (Insulated Gate Bipolar Transistor) to which a diode is connected in antiparallel. The emitter terminals of the second semiconductor switching devices (IGBTs on the low-voltage side) SuL, SvL, and SwL are connected to the negative terminal VL, and the collector terminals of the first semiconductor switching devices (IGBTs on the high-voltage side) SuH, SvH, and SwH are connected to the positive terminal VH. In addition, the respective connection points between the first semiconductor switching devices and the second semiconductor switching devices are AC output terminals Vu0, Vv0, and Vw0 of the U-phase bridge circuit (SuH and SuL), the V-phase bridge circuit (SvH and SvL), and the W-phase bridge circuit (SwH and SwL). Hereinafter, the semiconductor switching devices SuH, SvH, SwH, SuL, SvL, and SwL are referred to as switch devices SuH, SvH, SwH, SuL, SvL, and SwL.

The U-phase switch circuit (SuMH and SuML), the V-phase switch circuit (SvMH and SvML), and the W-phase switch circuit (SwMH and SwML) are connected to the intermediate voltage terminal VM, and to the AC output terminals Vu0, Vv0, and Vw0 of the U-phase bridge circuit (SuH and SuL), the V-phase bridge circuit (SvH and SvL), and the W-phase bridge circuit (SwH and SwL), respectively. Each of the U-phase switch circuit (SuMH and SuML), the V-phase switch circuit (SvMH and SvML), and the W-phase switch circuit (SwMH and SwML) includes two semiconductor switching devices connected in series in directions opposite to each other, and has a bidirectional characteristic. Each of the semiconductor switching devices SuMH, SuML, SvMH, SvML, SwMH, and SwML may be, for example, an IGBT to which a diode is connected in antiparallel. Hereinafter, the semiconductor switching devices SuMH, SuML, SvMH, SvML, SwMH, and SwML are referred to as switch devices SuMH, SuML, SvMH, SvML, SwMH, and SwML.

Next, the configurations of the single-phase inverters 2a, 2b, and 2c will be described. The single-phase inverter 2a includes: for example, MOSFETs (Metal-Oxide-Semiconductor Field-Effect Transistors) Su1 to Su4 (hereinafter, simply referred to as switch devices Su1 to Su4) to each of which a diode is connected in antiparallel, as four semiconductor switching devices; and a capacitor Cu. The switch devices Su1 and Su2 are connected in series, and the switch devices Su3 and Su4 are connected in series. The source terminals of the switch devices Su2 and Su4 on the low-voltage side are connected to the low voltage terminal of the capacitor Cu, and the drain terminals of the switch devices Su1 and Su3 on the high-voltage side are connected to the high voltage terminal of the capacitor Cu. Thus, the single-phase inverter 2a is a full-bridge inverter. It is noted that the single-phase inverters 2b and 2c for V-phase and W-phase also have the same configuration as described above, though only the configuration of the single-phase inverter 2a for U-phase is shown in the drawing.

One of the AC output terminals of each of the single-phase inverters 2a, 2b, and 2c is connected to the corresponding one of the AC output terminals Vu0, Vv0, and Vw0 of the three-level inverter 1, and the other AC output terminals Vu1, Vv1 and Vw1 (Vv1 and Vw1 are not shown) are connected to the three-phase load 5 via the three-phase filter 3 and a relay 6.

By the above configuration, the total voltage of the output voltage of the three-level inverter 1 and the output voltages of the single-phase inverters 2a, 2b, and 2c is supplied, as three-phase AC voltages, to the three-phase load 5.

Figure 2:
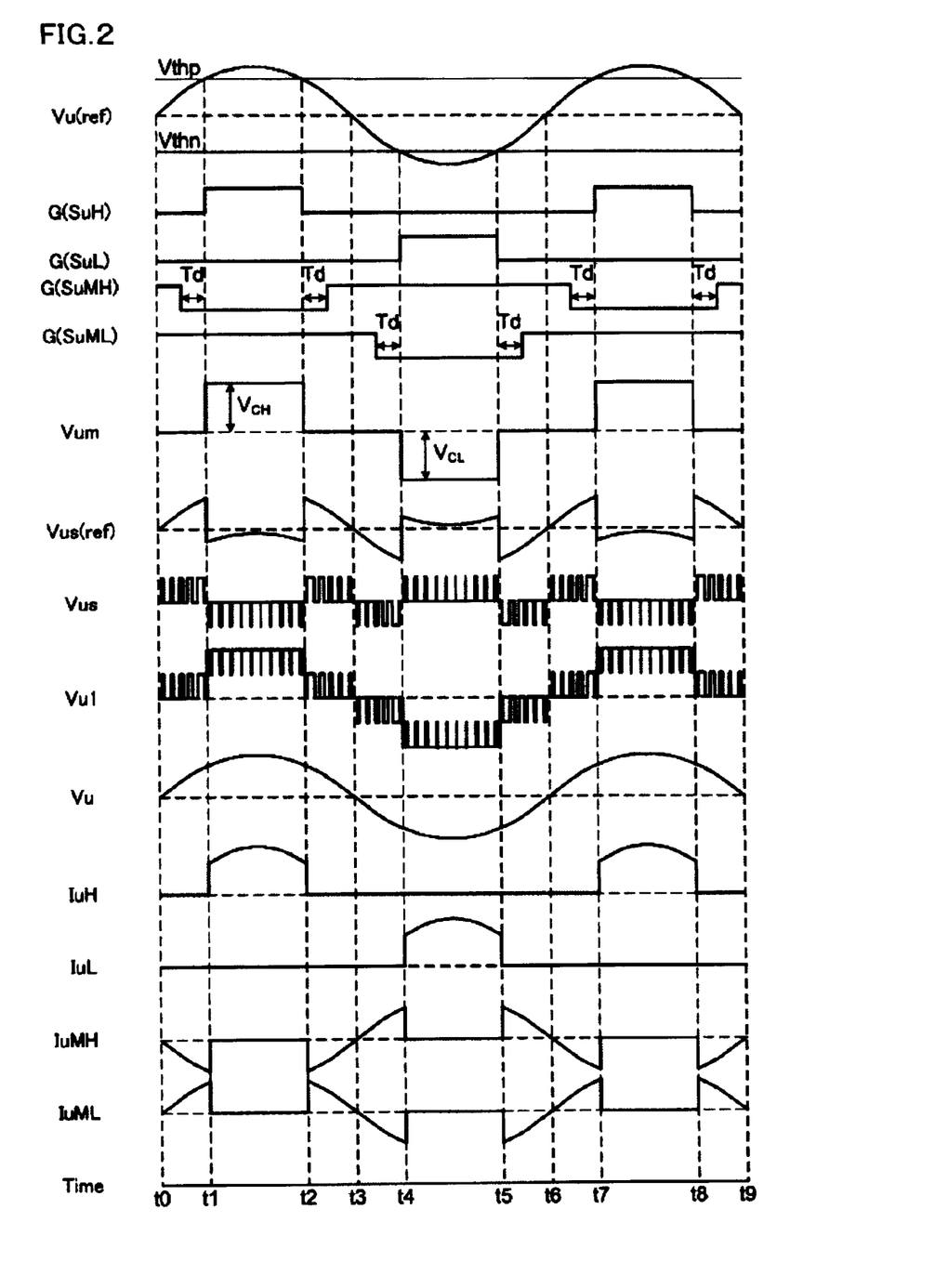
FIG. 2 is a diagram for explaining the overall operation for U-phase of the power conversion apparatus according to embodiment 1 of the present invention.

Next, the operation of the power conversion apparatus will be described. FIG. 2 is a diagram for explaining the overall operation for U-phase of the power conversion apparatus according to embodiment 1 of the present invention. It is noted that since the overall operations for V-phase and W-phase are the same as that for U-phase, the description thereof will be omitted.

In FIG. 2, Vu(ref) represents a V-phase voltage instruction value, G(SuH) represents a gate signal of the switch device SuH, G(SuL) represents a gate signal of the switch device SuL, G(SuMH) represents a gate signal of the switch device SuMH, G(SuML) represents a gate signal of the switch device SuML, Vum represents an output voltage of the three-level inverter, Vus(ref) represents a single-phase inverter voltage instruction value, Vus represents a single-phase inverter output voltage, Vu1 represents the U-phase output voltage that is yet to pass the filter, Vu represents the U-phase output voltage that has passed the filter, IuH represents a current flowing in the switch device SuH, IuL represents a current flowing in the switch device SuL, IuMH represents a current flowing in the switch device SuMH, and IuML represents a current flowing in the switch device SuML.

When the U-phase voltage instruction value Vu(ref) of the power conversion apparatus 10 is larger than a first setting value Vthp (>0), the three-level inverter 1 turns on the switch devices SuH and SuML, and turns off the switch devices SuL and SuMH, thereby outputting a positive voltage $V_{CH}$ between the AC output terminal Vu0 and the intermediate voltage terminal VM.

In addition, when the U-phase voltage instruction value Vu(ref) is smaller than a second setting value Vthn (<0), the three-level inverter 1 turns on the switch devices SuL and SuMH, and turns off the switch devices SuH and SuML, thereby outputting a negative voltage $(-V_{CL})$ between the AC output terminal Vu0 and the intermediate voltage terminal VM.

When the U-phase voltage instruction value Vu(ref) is equal to or larger than the second setting value Vthn and equal to or smaller than the first setting value vthp, the three-level inverter 1 turns off the switch devices SuH and SuL, thereby outputting a zero voltage between the AC output terminal Vu0 and the intermediate voltage terminal VM. The switch device SuMH is turned on after a dead time Td has passed since the switch device SuH was turned off, and the switch device SuML is turned on after the dead time Td has passed since the switch device SuL was turned off.

As described above, the three-level inverter 1 outputs, as the output voltage Vum for U-phase, three kinds of voltages of the positive voltage $V_{CH}$, the zero voltage, and the negative voltage ($-V_{CL}$) that are in synchronization with the frequency of the U-phase voltage instruction value Vu(ref) of the power conversion apparatus 10. If the power conversion apparatus 10 is operated at a power factor of 1, the three-level inverter 1 outputs, for U-phase, one-pulse voltage having a predetermined pulse width including the middle point of the half period of a current for U-phase, per half period of the current, the polarity of the one-pulse voltage being the same as that of the current. Here, the voltage $V_{CH}$ is the voltage between the terminals of the capacitor CH, and the voltage $V_{CH}$, is the voltage between the terminals of the capacitor CL.

The first and second setting values Vthp and Vthn are determined in accordance with the capacitor voltages $V_{CH}$ and $V_{CH}$ of the three-level inverter 1, the U-phase voltage instruction value Vu(ref), and a voltage $V_{CU}$ of the capacitor CU of the single-phase inverter 2a. It is noted that the voltage $V_{CU}$ of the capacitor CU of the single-phase inverter 2a is smaller than each of the voltage $V_{CH}$ between the terminals of the capacitor CH, and the voltage $V_{CL}$ between the terminals of the capacitor CL.

The single-phase inverter 2a outputs the positive voltage $V_{CU}$ between the AC output terminals (Vu0 and Vu0) of the single-phase inverter 2a by the switch devices Su2 and Su3 being turned on and the switch devices Su1 and Su4 being turned off. In addition, the single-phase inverter 2a outputs the negative voltage ($-V_{CU}$) between the AC output terminals (Vu1 and Vu0) by the switch devices Su1 and Su4 being turned on and the switch devices Su2 and Su3 being turned off. When the switch devices Su1 and Su3 are on and the switch devices Su2 and Su4 are off, or when the switch devices Su2 and Su4 are on and the switch devices Su1 and Su3 are off, the single-phase inverter 2a outputs a zero voltage. In this way, the single-phase inverter 2a outputs, as its output voltage Vus, three kinds of voltages of the positive voltage $V_{CU}$, the zero voltage, and the negative voltage ($-V_{CU}$).

The single-phase inverter 2a is operated so as to compensate for the differential voltage between the U-phase voltage instruction value Vu(ref) of the power conversion apparatus 10, and the output voltage Vum of the three-level inverter 1. Therefore, the voltage instruction value Vus(ref) of the single-phase inverter 2a is represented by the following expression (1).

$$Vus(ref)=Vu(ref)-Vum \qquad \text{Expression (1)}$$

In addition, the single-phase inverter 2a performs PWM (Pulse Width Modulation) control in accordance with the voltage instruction value Vus(ref) and the capacitor voltage $V_{CU}$, to cause the switch devices Su1 to Su4 to perform switching operation, thereby outputting the voltage Vus.

Then, the total voltage Vu1 of the output voltage Vum for U-phase of the three-level inverter 1, and the output voltage Vus of the single-phase inverter 2a is inputted to the three-phase filter 3, and the three-phase filter 3 outputs the sine wave voltage Vu between the U-terminal and the intermediate voltage terminal VM, from which a harmonic component has been removed.

Also regarding V-phase and W-phase, voltages corresponding to the respective voltage instruction values for V-phase and W-phase are outputted, whereby three-phase AC voltages are outputted to the U-terminal, the V-terminal, and the W-terminal of the power conversion apparatus 10.

Next, the waveforms of currents flowing in the semiconductor switching devices of the three-level inverter 1 will be described. The power factor of AC output is 1. It is noted that also here, the waveforms of currents flowing in the semiconductor switching devices (SuH, SuL, SuML, and SuMH) for U-phase will be described, but the waveforms for V-phase and W-phase are the same as those for U-phase.

As shown in FIG. 2, regarding a period from 0 to π (t0 to t3) in which the polarities of the voltages and the currents are positive, in a period from t0 to t1 and a period from t2 to t3, both the switch devices SuH and SuL are off, and therefore, currents flow in the IGBT of the switch device SuML and the diode of the switch device SuMH. The number of semiconductor switching devices in which currents flow is two per one phase, but the current values are small. Therefore, conduction loss in these two periods is relatively small. In a period from t1 to t2, the switch device SuH is on, and therefore, a current flows in only the IGBT of the switch device SuH. This period includes the middle point of the half period of the current, and in this period, the current value is large. However, the number of semiconductor switching devices in which currents flow is one per one phase, that is, a current flows in only the switch device SuH. Therefore, conduction loss in this period is suppressed to the minimum level.

Regarding a period from π to 2π (t3 to t6) in which the polarities of the voltages and the currents are negative, in a period from t3 to t4 and a period from t5 to t6, both the switch devices SuH and SuL are off, and therefore, currents flow in the diode of the switch device SuML and the IGBT of the switch device SuMH. The number of semiconductor switching devices in which currents flow is two per one phase, but the current values are small. Therefore, conduction loss in these two periods is relatively small. In a period from t4 to t5, the switch device SuL is on, and therefore, a current flows in only the IGBT of the switch device SuL. This period includes the middle point of the half period of the current, and in this period, the current value is large. However, the number of semiconductor switching devices in which currents flow is one per one phase, that is, a current flows in only the switch device SuL. Therefore, conduction loss in this period is suppressed to the minimum level.

Next, a surge voltage that occurs when each of the semiconductor switching devices (SuH, SuL, SuML, and SuMH) of the three-level inverter 1 performs switching operation will be described. When the switch device SuH performs switching operation, a surge voltage proportional to the product of a parasitic inductance LuH and a current change rate is applied to the switch device SuH. In this case, the above parasitic inductance LuH is the sum of parasitic inductances occurring in the three semiconductor switching devices (SuH, SuMH, and SuML), the capacitor CH, and lines connecting these components.

In the present embodiment, the power conversion apparatus 10 includes, for U-phase, the U-phase bridge circuit (SuH and SuL), and the U-phase switch circuit (SuMH and SuML) having a bidirectional characteristic. Therefore, in comparison with the conventional power conversion apparatus previously described, line paths that contribute to a surge voltage increase, and the parasitic inductance LuH is likely to be large. If the parasitic inductance is large, the current change rate needs to be decreased so that the surge voltage is equal to or smaller than the device breakdown voltage, and in general, if the current change rate is decreased, switching loss increases. However, since the three-level inverter 1 outputs a voltage by low-frequency switching that is in synchronization with the frequency of the U-phase voltage instruction value Vu(ref) of the power conversion apparatus 10, the number of times each of the semiconductor switching devices (SuH, SuL, SuML, and SuMH) of the three-level inverter 1 performs switching operation is small, and the increase in switching loss is negligible.

As described above, in the present embodiment, in periods in which the current value is large, the number of semiconductor switching devices in which currents flow in the three-level inverter 1 is one per one phase. Therefore, it is possible to reduce conduction loss and improve power conversion efficiency. In addition, owing to the improvement in power conversion efficiency, it is possible to reduce the discharge amount of carbon dioxide, and to reduce the cost and the size of the power conversion apparatus by simplification of a cooling apparatus.

In addition, in periods in which a current flows in each of the switch circuits (SuMH and SuML), (SvMH and SvML), and (SwMH and SwML) for the three phases, the current value is relatively small. Therefore, devices whose ratings of current are small can be used for the semiconductor switching devices of the switch circuits (SuMH and SuML), (SvMH and SvML), and (SwMH and SwML) for the three phases, whereby it becomes possible to reduce the cost and the size.

In addition, the single-phase inverter 2a outputs a voltage by PWM control so as to compensate the differential voltage between the U-phase voltage instruction value Vu(ref) of the power conversion apparatus 10, and the output voltage Vum of the three-level inverter 1. Therefore, a harmonic component included in the output voltage of the power conversion apparatus 10 can be reduced.

In addition, the number of times the three-level inverter 1, which performs switching operation at a relatively large voltage, performs the switching operation is small. Moreover, the single-phase inverter 2a, which performs high-frequency switching operation by PWM control, performs the switching operation at a relatively small voltage. Therefore, increase in switching loss is suppressed in both the three-level inverter 1 and the single-phase inverter 2a.

It is noted that although IGBTs are used as the semiconductor switching devices of the three-level inverter 1, the same effect is obtained even in the case where, for example, MOSFETs or bipolar transistors are used as the semiconductor switching devices.

Figure 3:
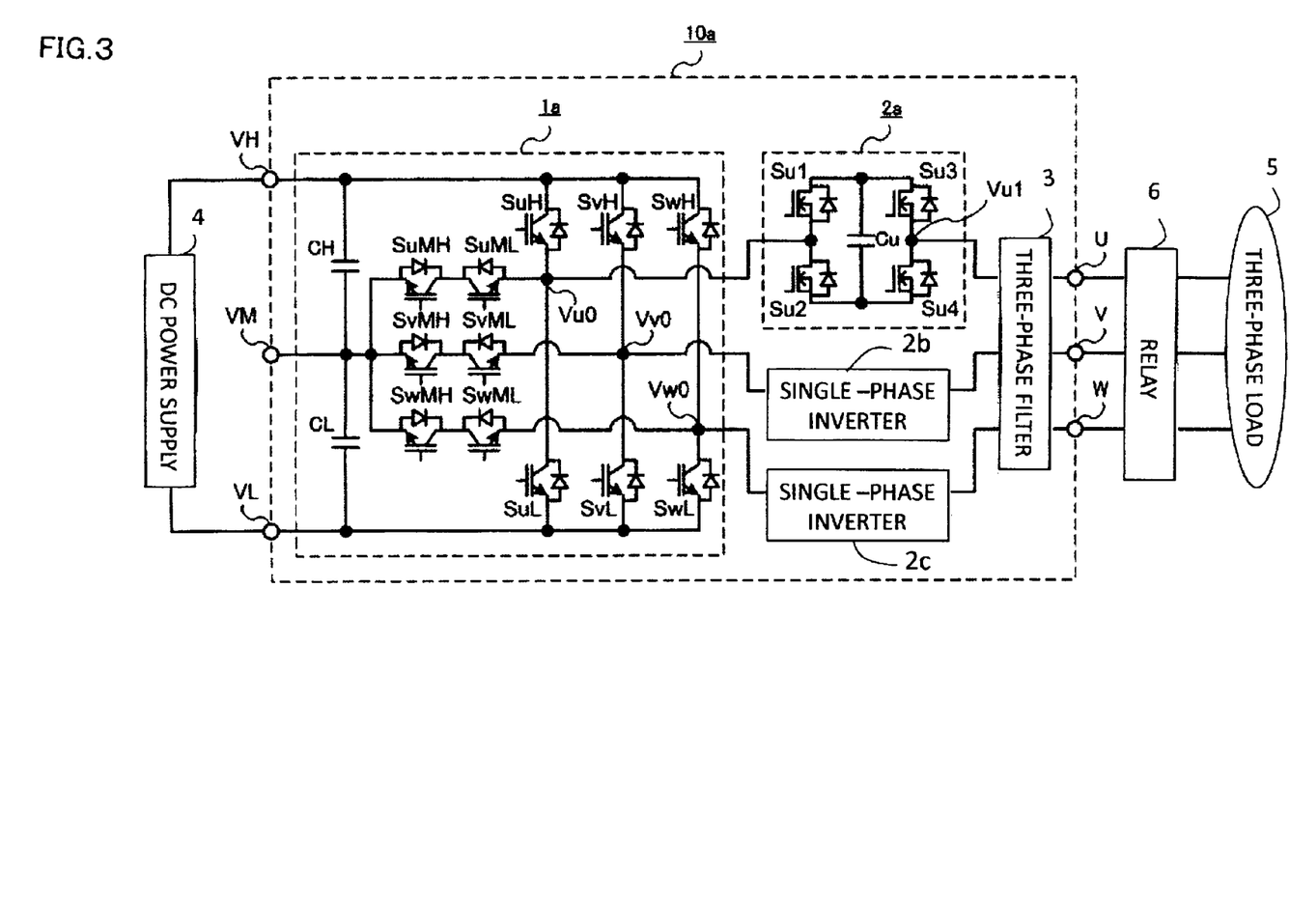
FIG. 3 is a diagram showing another circuit configuration of a power conversion apparatus according to embodiment 1 of the present invention.

In addition, in the present embodiment, the emitter terminals of the two semiconductor switching devices (IGBTs) of each of the switch circuits (SuMH and SuML), (SvMH and SvML), and (SwMH and SwML) for the three phases are connected to each other. However, a configuration shown in FIG. 3 may be employed. That is, the collector terminals may be connected to each other as in the switch circuits (SuMH and SuML), (SvMH and SvML), and (SwMH and SwML) for the three phases of a three-level inverter 1a of a power conversion apparatus 10a. The switch circuits also have bidirectional characteristics, and provide the same effect.

Embodiment 2

Figure 4:
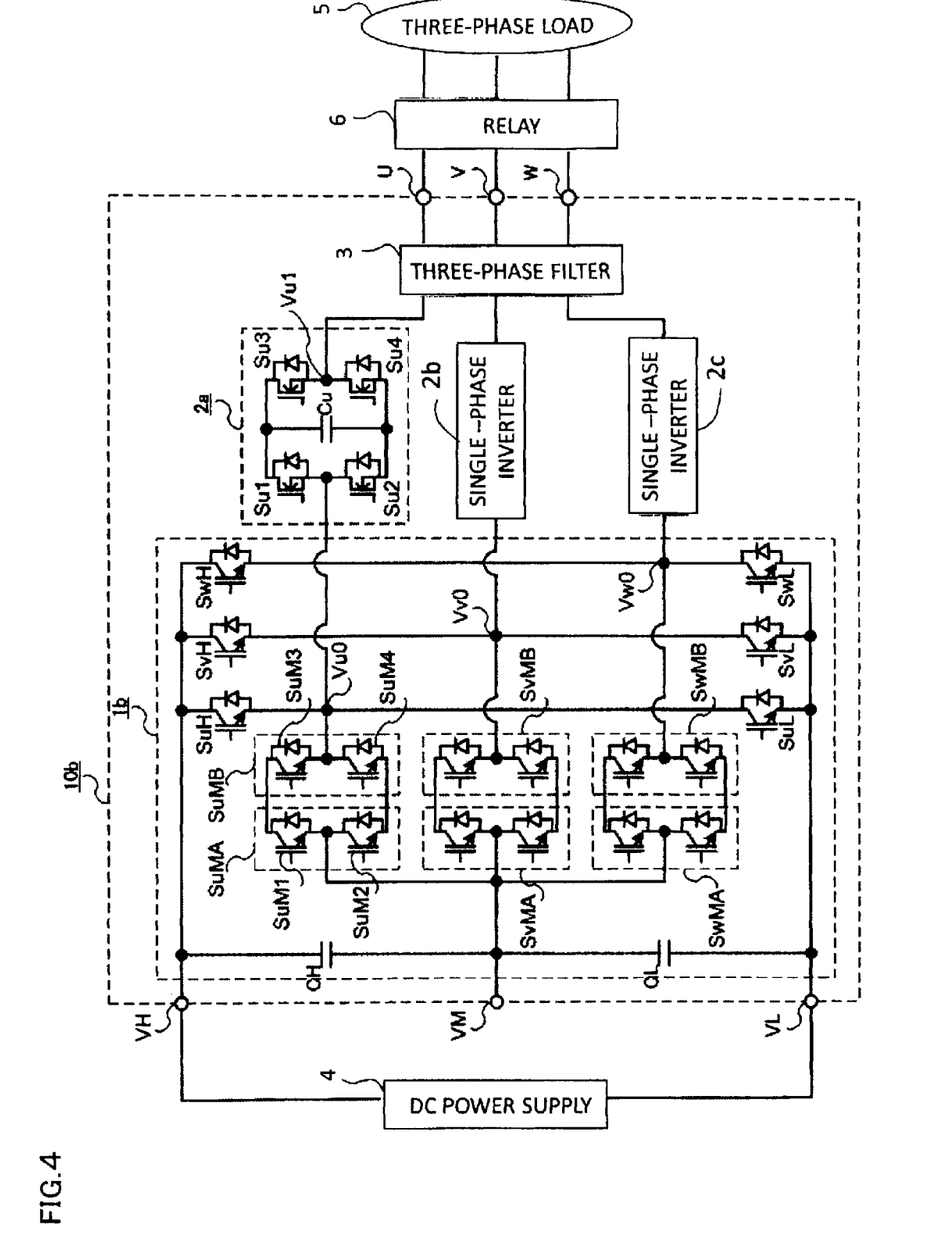
FIG. 4 is a diagram showing the circuit configuration of a power conversion apparatus according to embodiment 2 of the present invention.

FIG. 4 is a diagram showing the circuit configuration of a power conversion apparatus 10b according to embodiment 2 of the present invention. The power conversion apparatus 10b of embodiment 2 includes a three-level inverter 1b, the single-phase inverters 2a, 2b, and 2c, and the three-phase filter 3. The power conversion apparatus 10b converts a DC power outputted from the DC power supply 4, to an AC power, and supplies the AC power to the three-phase load 5. As shown in FIG. 4, the configurations of switch circuits (SuMA and SuMB), (SvMA and SvMB), and (SwMA and SwMB) for three phases in the three-level inverter 1b are different from those in embodiment 1 shown in FIG. 1. The configurations of the other components are the same as those shown in FIG. 1.

The U-phase switch circuit (SuMA and SuMB), the V-phase switch circuit (SvMA and SvMB), and the W-phase switch circuit (SwMA and SwMB) are connected to the intermediate voltage terminal VM, and to the AC output terminals Vu0, Vv0, and Vw0 of the U-phase bridge circuit (SuH and SuL), the V-phase bridge circuit (SvH and SvL), and the W-phase bridge circuit (SwH and SwL), respectively. These switch circuits function as switches having bidirectional characteristics.

Hereinafter, the configuration of the U-phase switch circuit (SuMA and SuMB) will be described. It is noted that the V-phase switch circuit (SvMA and SvMB) and the W-phase switch circuit (SwMA and SwMB) also have the same configurations as described below.

The U-phase switch circuit (SuMA and SuMB) includes two power modules SuMA and SuMB whose low-voltage terminals are connected to each other and whose high-voltage terminals are connected to each other. The intermediate terminals of the two power modules SuMA and SuMB are used as both terminals of the U-phase switch circuit (SuMA and SuMB). Each of the power modules SuMA and SuMB includes two semiconductor switching devices (IGBTs) to each of which a diode is connected in antiparallel, the semiconductor switching devices being connected in series and stored in one package. That is, the power module SuMA includes semiconductor switching devices (IGETs) SuM1 and SuM2 connected in series, and the power module SuMB includes semiconductor switching devices (IGBTs) SuM3 and SuM4 connected in series.

Here, in the two power modules SuMA and SuMB, the emitter terminals of the IGBTs (SuM2 and SuM4) on the low-voltage side are connected to each other, and the collector terminals of the IGBTs (SuM1 and SuM3) on the high-voltage side are connected to each other. One of the terminals of the U-phase switch circuit (SuMA and SuMB) that is the connection point (intermediate terminal) between the switch devices SuM1 and SuM2, is connected to the intermediate voltage terminal VM. The other one of the terminals of the U-phase switch circuit (SuMA and SuMB), which is the connection point (intermediate terminal) between the switch devices SuM3 and SuM4, is connected to the U-phase output terminal Vu0 of the three-level inverter 1b.

Figure 5:
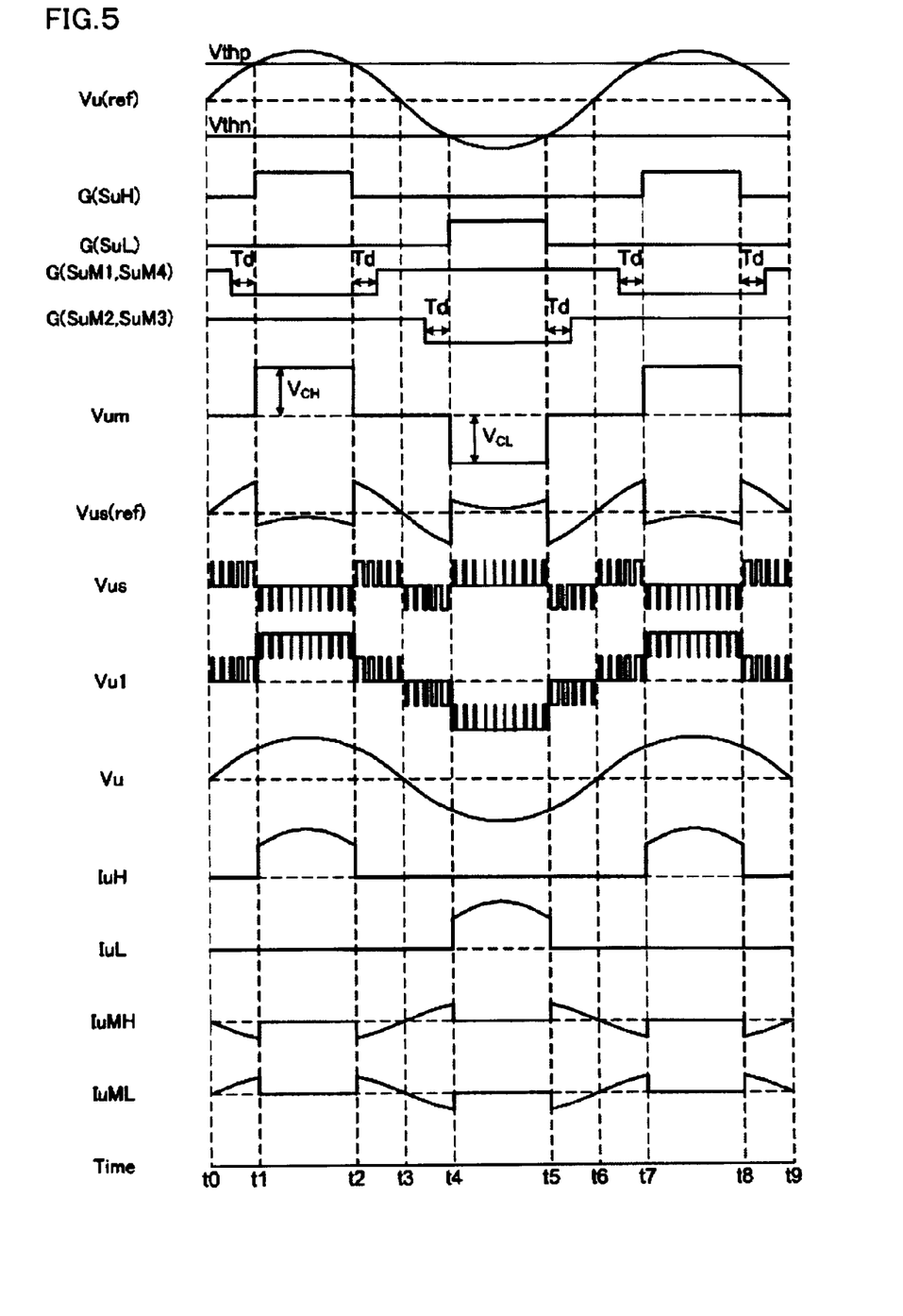
FIG. 5 is a diagram for explaining the overall operation for U-phase of the power conversion apparatus according to embodiment 2 of the present invention.

Next, operation will be described. FIG. 5 is a diagram for explaining the overall operation for U-phase of the power conversion apparatus according to embodiment 2 of the present invention. It is noted that since the overall operations for V-phase and W-phase are the same as that for U-phase, the description thereof will be omitted.

In FIG. 5, Vu(ref) represents a U-phase voltage instruction value, G(SuH) represents a gate signal of the switch device SuH, G(SuL) represents a gate signal of the switch device SuL, G(SuM1, SuM4) represents a gate signal of each of the switch devices SuM1 and SuM4, G(SuM2, SuM3) represents a gate signal of each of the switch devices SuM2 and SuM3, Vum represents an output voltage of the three-level inverter, Vus(ref) represents a single-phase inverter voltage instruction value, Vus represents a single-phase inverter output voltage, Vu1 represents the U-phase output voltage that is yet to pass the filter, Vu represents the U-phase output voltage that has passed the filter, IuH represents a current flowing in the switch device SuH, IuL represents a current flowing in the switch device SuL, IuMH represents a current flowing in each of the switch devices SuM1 and SuM4, and IuML represents a current flowing in each of the switch devices SuM2 and SuM3.

When the U-phase voltage instruction value Vu(ref) of the power conversion apparatus 10b is larger than the first setting value Vthp (>0), the three-level inverter 1b turns on the switch devices SuH, SuM2, and SuM3, and turns off the switch devices SuL, SuM1, and SuM4, thereby outputting the positive voltage $V_{CH}$ between the AC output terminal Vu0 and the intermediate voltage terminal VM.

In addition, when the U-phase voltage instruction value Vu(ref) is smaller than the second setting value Vthn (<0), the three-level inverter 1 turns on the switch devices SuL, SuM1, and SuM4, and turns off the switch devices SuH, SuM2, and SuM3, thereby outputting the negative voltage ($-V_{CL}$) between the AC output terminal Vu0 and the intermediate voltage terminal VM. When the U-phase voltage instruction value Vu(ref) is equal to or larger than the second setting value Vthn and equal to or smaller than the first setting value Vthp, the three-level inverter 1 turns off the switch devices SuH and SuL, thereby outputting a zero voltage between the AC output terminal Vu0 and the intermediate voltage terminal VM. The switch devices SuM1 and SuM4 are turned on after the dead time Td has passed since the switch device SuH was turned off, and the switch devices SuM2 and SuM3 are turned on after the dead time Td has passed since the switch device SuL was turned off.

It is noted that a manner of generation of the first and second setting values Vthp and Vthn, and a manner of operation of the single-phase inverter 2a are the same as those in embodiment 1.

Also in the present embodiment, similarly to embodiment 1, the three-level inverter 1b outputs, as the output voltage Vum for U-phase, three kinds of voltages of the positive voltage $V_{CH}$, the zero voltage, and the negative voltage ($-V_{CL}$) that are in synchronization with the frequency of the U-phase voltage instruction value Vu(ref) of the power conversion apparatus 10b. If the power conversion apparatus 10b is operated at a power factor of 1, the three-level inverter 1b outputs, for U-phase, one-pulse voltage having a predetermined pulse width including the middle point of the half period of a current for U-phase, per half period of the current, the polarity of the one-pulse voltage being the same as that of the current. In a period in which the one-pulse voltage is outputted, the current value is large but the number of semiconductor switching devices in which currents flow is one per one phase. Therefore, conduction loss is suppressed to the minimum level.

In addition, in a period in which both the switch devices SuH and SuL are off, a current flows being divided into two current paths, i.e., a current path passing the switch devices SuM1 and SuM3, and a current path passing the switch devices SuM2 and SuM4. The number of semiconductor switching devices in which currents flow is four per one phase. However, in this period, the current values are relatively small, and the value of a current flowing in each of the semiconductor switching devices is a half of the current value in embodiment 1. Therefore, conduction loss in this period is relatively small as in embodiment 1.

As described above, the present embodiment provides the same effect as embodiment 1. In addition, if two general power modules each including two devices, which are distributed in large amount and have much variation in type, are used for each of the switch circuits (SuMA and SuMB), (SvMA and SvMB), and (SwMA and SwMB), it becomes possible to easily fabricate a power conversion apparatus that is low in cost and has a high efficiency.

It is noted that although in embodiments 1 and 2, one single-phase inverter (2a, 2b, or 2c) is provided for each phase, a plurality of single-phase inverters may be connected in series to the three-level inverter 1 (1a or 1b) for each phase.

In addition, although the three-level inverter 1 (1a or 1b) outputs a one-pulse voltage per half period of a current, a voltage by PWM control may be outputted before and after the one-pulse voltage such that the voltages by PWM control and the one-pulse voltage are sequentially outputted. As a result, DC voltages in the single-phase inverters 2a, 2b, and 2c can be reduced.

In addition, although in the above embodiments, the cases where the power conversion apparatuses 10, 10a, and 10b are three-phase power conversion apparatuses have been described, the power conversion apparatuses 10, 10a, and 10b may be single-phase power conversion apparatuses or other multiphase power conversion apparatuses.

The invention claimed is:

1. A power conversion apparatus comprising:
a three-level inverter including
a bridge circuit including a first semiconductor switching device and a second semiconductor switching device connected in series, the bridge circuit being connected to a positive terminal and a negative terminal of a DC power supply,
a switch circuit having a bidirectional characteristic and connected to an AC output terminal of the bridge circuit which is a connection point between the first semiconductor switching device and the second semiconductor switching device, and to an intermediate potential point of the DC power supply,
a first smoothing capacitor connected to the intermediate potential point of the DC power supply and connected to the positive terminal of the DC power supply, and
a second smoothing capacitor connected to the intermediate potential point of the DC power supply and connected to the negative terminal of the DC power supply;
a single-phase inverter including a plurality of semiconductor switching devices and a capacitor, and connected in series to the AC output terminal of the bridge circuit, wherein
a voltage of the capacitor of the single-phase inverter is smaller than each voltage of the smoothing capacitors of the three-level inverter,
a drive frequency of the semiconductor switching devices of the single-phase inverter is higher than a drive frequency of the semiconductor switching devices of the three-level inverter, and
a sum of an output voltage of the three-level inverter and an output voltage of the single-phase inverter is supplied to a load.

2. The power conversion apparatus according to claim 1, wherein the switch circuit having the bidirectional characteristic includes two semiconductor switching devices connected in series in directions opposite to each other.

3. The power conversion apparatus according to claim 1, wherein
the switch circuit having the bidirectional characteristic includes two power modules each of which includes a plurality of semiconductor switching devices connected in series, wherein
low-voltage terminals of the power modules are connected to each other,
high-voltage terminals of the power modules are connected to each other, and
two intermediate terminals of the power modules are respective terminals of the switch circuit.

4. The power conversion apparatus according to claim 1, wherein the three-level inverter outputs a one-pulse voltage per half period of a corresponding current, wherein the outputting includes adjusting a predetermined pulse width of the one-pulse voltage so that a total amount of power fluctuation of the capacitor of the single-phase inverter becomes approximately zero.

5. The power conversion apparatus according to claim 4, wherein the three-level inverter outputs a voltage by PWM control before and after the one-pulse voltage, per half period of the current.

6. The power conversion apparatus according to claim 4, wherein the three-level inverter outputs the one-pulse voltage in a period in which the absolute value of a voltage instruction to the load is larger than a predetermined value.

7. The power conversion apparatus according to claim 4, wherein:
   the predetermined pulse width includes a middle point corresponding to the half period of the corresponding current, and
   the polarity of the one-pulse voltage is the same as that of the corresponding current.

8. The power conversion apparatus according to claim 1, wherein the single-phase inverter outputs a voltage by (Pulse Width Modulation) PWM control, compensating for a differential voltage between a voltage instruction to the load and an output voltage of the three-level inverter.

9. The power conversion apparatus according to claim 1, wherein
   the three-level inverter outputs a one-pulse voltage in a period in which the absolute value of a voltage instruction to the load is larger than a predetermined value.

10. The power conversion apparatus according to claim 9, wherein
   when the absolute value of the voltage instruction is larger than the predetermined value, a number of the semiconductor switching devices in which currents flow in each phase of the three-level inverter is one.

11. The power conversion apparatus according to claim 1, wherein:
   the three-level inverter outputs a one-pulse voltage per half period of a corresponding current, and
   a midpoint of the one-pulse voltage corresponds to a maximum magnitude of the corresponding current.

* * * * *